Nov. 2, 1926.   1,605,493
D. E. ANDERSON
METHOD OF CUTTING BOLT HOLES
Original Filed April 26, 1923

Inventor
David E. Anderson
By (signature)
Attorney

Patented Nov. 2, 1926.

1,605,493

UNITED STATES PATENT OFFICE.

DAVID E. ANDERSON, OF ST. PAUL, MINNESOTA.

METHOD OF CUTTING BOLT HOLES.

Original application filed April 26, 1923, Serial No. 634,921. Divided and this application filed January 25, 1926. Serial No. 83,775.

My invention relates to the method of cutting bolt holes in a rail or other article where it is desired to cut through a piece of steel in the shortest possible time to save labor and expense of cutting such holes. This application in a division of my patent application, Serial Number 634,921, filed April 26th, 1923.

A feature of the invention resides in the use of a guide to assist in cutting a certain shaped hole which is used in connection with the nozzle of an acetylene blow torch in a manner so as to cut a hole in a railroad rail or other article. The method includes a means of cutting a hole so that the fractured portion of the rail or article being cut is entirely cut away so that the strength of the article cut is not impaired by cutting with a blow torch flame. In using a blow torch to cut holes in articles of steel, the fine acetylene flame penetrates through the material making a hole and this intense heat striking the cold steel fractures the same about the hole which is first cut through the material. My method is designed to entirely cut away the fractured portion made by the first penetrating hole of the acetylene flame.

The method includes the burning of a hole in a rail or other article by placing the blow torch nozzle in the center of the area which is to be cut away and burning a hole through the material, then following direct from this point to the outer periphery of the area to be cut away and around the periphery of the area being cut away, so that when the portion is cut away from the article to form a hole therein, the starting point of the blow torch flame or the first penetrating hole of the flame is entirely cut away, and thus the fractured portion of the steel or metal which was fractured about the penetrating hole is entirely cut away and the strength and resistance of the article in which the hole was cut is not destroyed.

My method of cutting bolt holes applies particularly to railroad rails and the like where it is desirable to cut these holes out on the right of way at a minimum expense and in the shortest time. It is apparent, however, that my method of cutting holes in metal is equally well adaptable for other purposes.

In the drawings forming part of my specification:

Figures 1, 3:
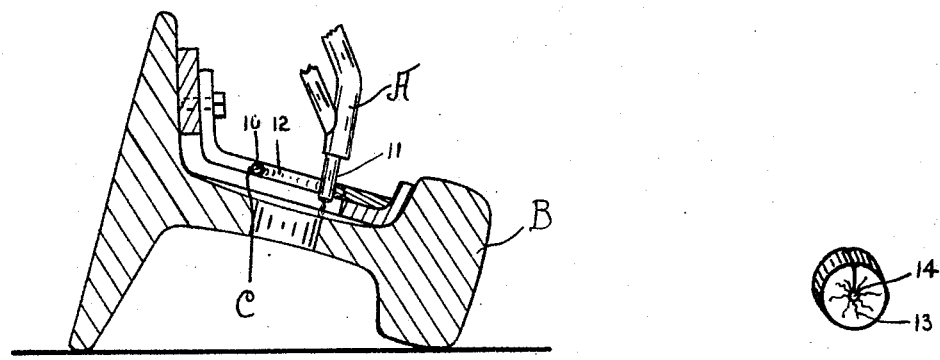
Figure 1 illustrates a side sectional view of a railroad rail in the act of being cut by my method.
Figure 3 illustrates in perspective the cut away portion which is cut from the rail in making a bolt hole with my method.
Figure 2:
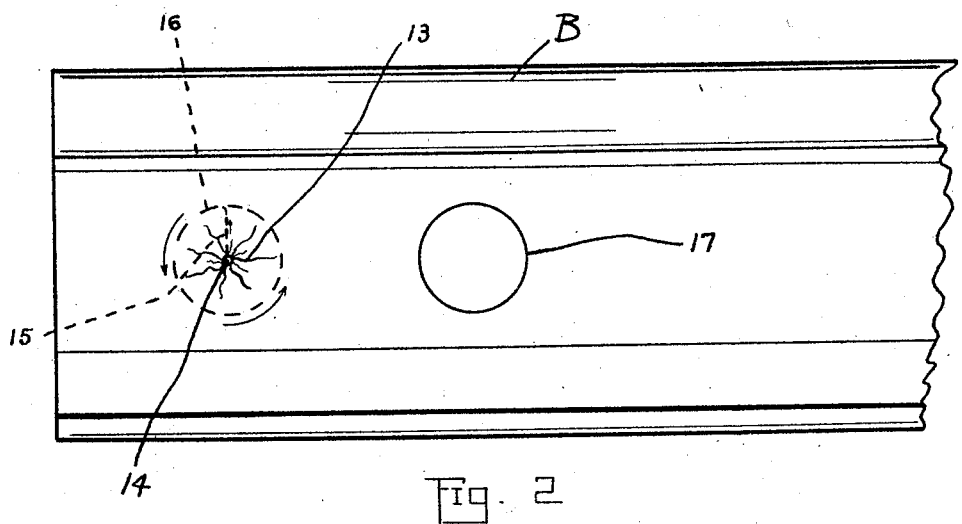
Figure 2 is a side view of a portion of a railroad rail to illustrate the carrying out of my method.
Figure 4:
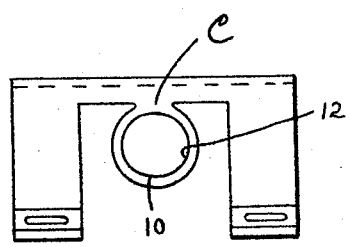
Figure 4 illustrates one form of a template which may be used in carrying out my method.

In carrying out my method I employ any suitable blow torch which may be provided with a nozzle such as A, the drawings only illustrating the nozzle of the blow torch, as the remainder of the blow torch is of ordinary well known construction.

My method is particularly adaptable to cut bolt holes in railroad rails such as B and I have illustrated the blow torch nozzle A operating with a template C which has a guide ring 10 for the end 11 of the nozzle A, so that the nozzle end 11 can follow around the inner surface 12 of the guide ring 10 on the template C.

In carrying out my method to cut bolt holes in a railroad rail such as B, the blow torch nozzle 11 is placed centrally of the area 13 to be cut away at the point 14 and held at this point until a hole is cut completely through the rail B at the point 14, then following along the dotted line 15 to the circumference or periphery 16, and following about the circumference 16 to cut away the entire area 13.

In Figure 3 I illustrate the cut-away portion 13 with the center hole 14 cut through the same and showing the cut-away portion as a plug to clearly illustrate the cut-away portion which forms a clean-cut bolt hole such as 17 in the rail B.

My method provides an economical means of cutting a hole in a rail or other article where it is desired to cut away a portion from the same and wherein it is desired and particularly important not to destroy the wearing qualities of the steel which is cut so that the same may remain tough and immune from fractures when placed under heavy strain. In railroad rails it is very important that the bolt holes 17 for connecting the ends of the respective rails together, be made in a manner so as not to fracture the rail by the intense heat of the blow torch or other instrument so as to destroy the efficiency and qualities of the steel making the rail. I have found that my method accomplishes this result by cutting away the fractured portion of the rail which is in and about the hole 14, as this is the point where the rail takes the shock of the heat in cutting the hole through the same and as the hole is cut through the knife-like action of the acetylene torch flame cuts up to the periphery of the area to be cut out very easily and rapidly. This portion of the rail has been heated by reason of the radiation of the heat from the point 14, sufficiently so that the cutting of the flame around the periphery of the area being cut out to form the desired opening in the rail B or other article wherein it is desired to cut a hole, will not fracture the steel along the line of cutting by the flame of the blow torch but will cut the portion out clean and completely so that the hole is formed in the rail B or other article without destroying the efficiency of the steel and making a very desirable means of cutting bolt holes in railroad rails.

I have used my method in cutting bolt holes in railroad rails quite extensively and have found it to be most desirable, saving time and labor and thereby providing means for permitting the replacement of rails in a short time after they are delivered at the place on the right-of-way where they are to be installed. This has many advantages as it permits new rails to be installed without holding up transportation very long, and providing a method which I believe is far in advance of cutting the bolt holes by any other means, in so far as I know.

In accordance with the Patent statutes I have described the principles of my method of cutting holes in steel or other material and while I have described a particular method, I desire to have it understood that this is only illustrative and that the invention can be carried out by other means and applied to uses other than those above set forth within the scope of the following claims.

I claim:

1. The method of cutting a bolt hole in a rail, consisting in placing a blow torch nozzle centrally to a guide and burning a hole directly through the rail, then following the guide substantially as described.

2. The method of burning a hole in a rail consisting in placing a torch in the center of a template guide and burning a hole through the rail and then following the template guide to cut a hole through the rail.

3. The method of cutting a hole consisting in placing a blow torch nozzle centrally to the portion to be cut away and burning a hole directly through the article to be cut out, then cutting from the center outwardly and around to entirely cut out the center starting hole to entirely cut away the fractured portion at the starting hole.

4. The method of burning a hole consisting in placing a blow torch nozzle centrally of the portion to be cut away and holding the same at this point until a hole is penetrated through the part to be cut away at the center thereof, then cutting outwardly from this center hole and following around to entirely cut away the center hole to eliminate any fractured portion caused by cutting the center hole.

DAVID E. ANDERSON.